Oct. 30, 1928.

C. MACMILLAN 1,689,532

POWER SYSTEM

Filed June 18, 1925

Inventor:
Campbell Macmillan,
by
His Attorney.

Patented Oct. 30, 1928.

1,689,532

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

POWER SYSTEM.

Application filed June 18, 1925. Serial No. 38,080.

My invention relates to power systems wherein a motor is supplied with current from an alternating current generator, and has for its principal object the provision of an improved arrangement whereby the speed torque characteristics of the motor, the excitation of the generator, and the connections between the motor and generator are controlled and correlated in a manner to produce smooth acceleration and deceleration of the motor and reversal of the connections between the motor and generator without producing undesirable fluctuations in the generator voltage and motor speed.

In my copending application for Letters Patent of the United States, Serial No. 34,684, filed June 3, 1925, I have disclosed and claimed a power system wherein the excitation of a generator and the secondary voltage of a motor are successively changed in a manner either to produce smooth acceleration and deceleration of the motor or to minimize fluctuations in the generator voltage. My present invention is in some respects similar to that disclosed in my aforesaid application but differs therefrom in that it comprises an arrangement whereby a single resistor connected in the generator field circuit is utilized both to assist in the acceleration and deceleration of the motor and to limit the open circuit voltage of the generator at light loads and during reversal of the connections between the motor and generator. Further differences between my prior and present inventions will become apparent as my present invention is considered in detail.

My present invention will be better understood from the following description when considered in connection with the accompanying drawing and its scope will be pointed out in the appended claims.

Figure 1:
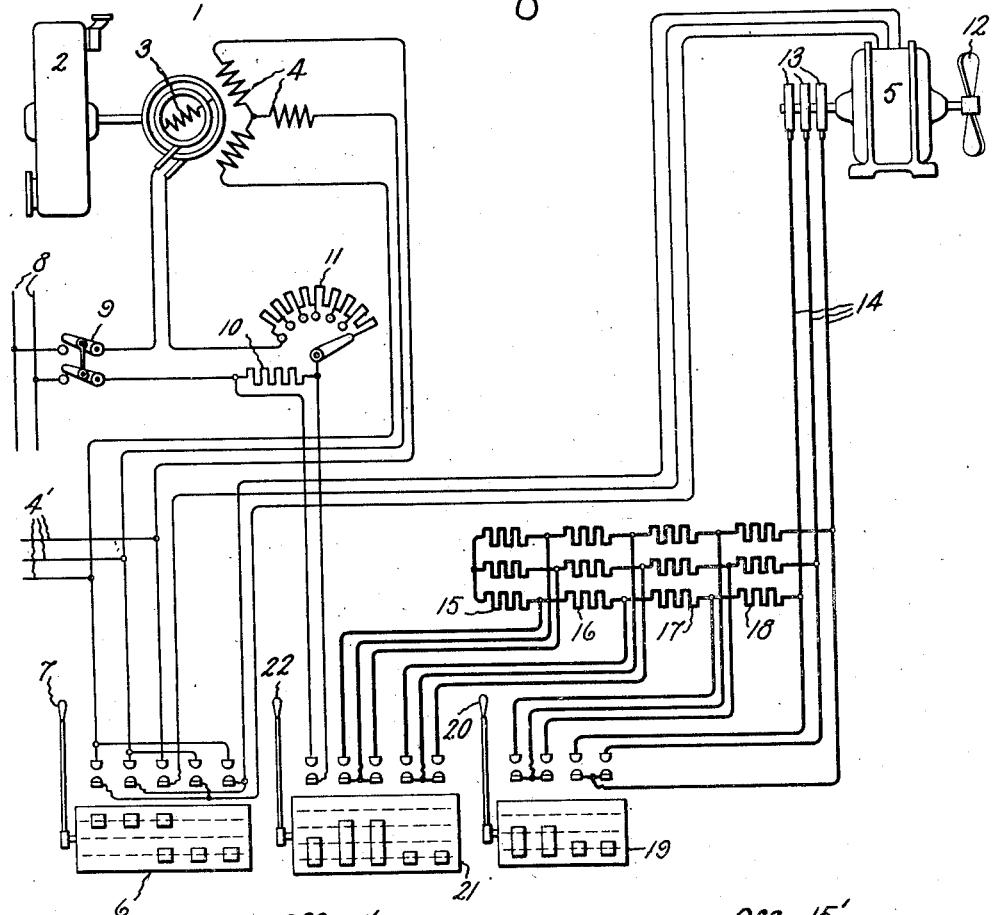
Figure 2:
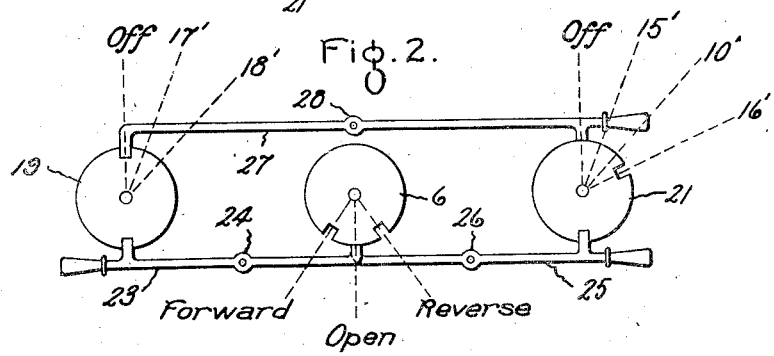

Referring to the drawing, Fig. 1 shows a system wherein my invention has been embodied; and Fig. 2 shows certain details in the mechanism for controlling the operation of this system.

Fig. 1 shows an alternating current generator 1 coupled to a steam turbine 2 and provided with a field winding 3 and an armature winding 4 which is directly connected to an auxiliary line 4' and is connected to the primary circuit of an induction motor 5 through a reversing controller 6 provided with an operating handle 7. Current is supplied to the generator field winding 3 from a suitable source through buses 8, switch 9, resistor 10 and an adjustable resistor 11. The motor 5 is shown as coupled to a propeller 12 and its secondary circuit is connected through slip rings 13 and leads 14 to an adjustable resistor comprising sections 15, 16, 17 and 18, a low resistance controller 19 provided with an operating handle 20 being arranged to control the connections of sections 17 and 18 and a high resistance controller 21 provided with an operating handle 22 being arranged to control the connections of sections 15 and 16.

The controllers 19 and 21 are interlocked to ensure that the resistor 10 is short circuited just after section 15 of the secondary resistor has been short circuited when the motor is being accelerated and is inserted in the generator field circuit just after section 16 is inserted in the secondary circuit during deceleration of the motor. The manner in which this result is accomplished is shown more clearly by Fig. 2.

As indicated by Fig. 2, the controller 6 is operable to "Forward", "Open" and "Reverse" positions; the controller 19 is operable to positions indicated by "Off", "17'" and "18'"; and the controller 21 is operable to positions indicated by "Off", "15'", "10'" and "16'". With the controller 6 in its open position, the controller 19 is locked in its off position by a member 23 pivoted at 24 and controller 21 is locked in its off position by member 25 pivoted at 26. With the controller 21 in any other position than 16', the controller 19 is locked in its off position by member 27 pivoted at 28. The adjustable resistor 11 may be operated independently of the controllers 6, 19 and 21 to fix the speed torque characteristic of the motor at a suitable value for the conditions under which the system is operated.

Assuming switch 9 to be closed, the generator 1 to be operating and reversing controller 6 to be in its open position, the resistor 10 is connected in the generator field circuit and the voltage applied to the auxiliary circuit 4' is maintained at a value comparable to that applied to this circuit when the generator is supplying a substantial amount of current to the motor 5. Movement of the controller 6 to either its forward or reverse position causes the motor 5 to be energized, the voltage applied to the motor and auxiliary circuits being restricted to a suitable value because of the fact that the resistor 10 is still connected in the generator field circuit. Upon movement of the controller 21 from its off position to position 15', the resistance section 15 is short circuited and the motor is correspondingly accelerated with the voltage of the generator still maintained at a comparatively low value by resistor 10. Movement of the controller 21 to position 10' however short circuits the generator field resistor 10, thus raising the generator voltage and further accelerating the motor 5. Still further acceleration of the motor 5 is produced by moving the controller 21 to its position 16', thus short circuiting the secondary resistor sections 16 and releasing the low resistance controller 19 which may then be operated to successively short circuit resistance sections 17 and 18. In the operation of systems of the character described, the provision of separately operated high resistance and low resistance controllers has been found of great advantage in that it definitely determines different speed ranges over which the motor may be operated and prevents too rapid acceleration of the motor when it is accelerated from rest to full speed.

The manner in which the motor is decelerated and reversed will be readily understood in view of the previous explanation. It will be observed that during both deceleration and acceleration of the motor the generator voltage is changed at a definite stage of the operation and is maintained at the reduced value during interruption and reversal of the connections between the motor and generator. The resistor 10 thus serves both to produce one step in the acceleration and deceleration of the motor and to prevent excessive rises in the generator voltage at light loads.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of a motor comprising primary and secondary circuits, means connected to said secondary circuit for controlling the speed torque characteristic of said motor, an alternating current generator comprising a field circuit and an armature circuit connected to said primary circuit, means for controlling the excitation of said generator, means for correlating the operation of said excitation and said speed torque characteristic control means throughout one range of change in said speed torque characteristic, and means operable to produce a further change in said speed torque characteristic only when said correlating means has been operated to a predetermined position.

2. The combination of a motor comprising primary and secondary circuits, means connected to said secondary circuit for controlling the speed torque characteristic of said motor, an alternating current generator comprising a field circuit and an armature circuit connected to said primary circuit, means for controlling the excitation of said generator, means for reversing the connections between said motor and generator, means for correlating the operation of said excitation and speed torque charactertistic control means throughout one range of operation, and means operable to produce further change in said speed torque characteristic only when said correlating and reversing means have been operated to predetermined positions.

3. The combination of a motor comprising primary and secondary circuits, means connected to said secondary circuit for controlling the speed torque characteristic of said motor, an alternating current generator comprising a field circuit and an armature circuit connected to said primary circuit, means for controlling the excitation of said generator, means for correlating the operation of said excitation and said speed torque characteristic control means throughout one range of change in said speed torque characteristic, means operable to produce a further change in said speed torque characteristic only when said correlating means has been operated to a predetermined position, and means for changing the excitation of said generator independently of said excitation control means.

4. The combination of a motor comprising primary and secondary circuits, an alternating current generator comprising a field circuit and an armature circuit connected to said primary circuit, means for reversing the connections between said armature and primary circuits, means for controlling the excitation of said generator, means for correlating the operation of said reversing and excitation control means, and means for controlling the excitation of said generator independently of said correlating and excitation control means.

5. The method of operating an electric power system wherein current is supplied to an induction motor from an alternating current generator, which comprises producing definitely related changes in the excitation of said generator and in the secondary resistance of said motor throughout one range of operation, and changing said secondary resistance independently of said generator excitation throughout another range of operation.

In witness whereof, I have hereunto set my hand this 17th day of June, 1925.

CAMPBELL MACMILLAN.